United States Patent [19]
Gielink et al.

[11] Patent Number: 5,800,581
[45] Date of Patent: Sep. 1, 1998

[54] AIR CLEANER HAVING FILTER ELEMENT INTEGRALLY FORMED WITH HOUSING END CAP

[75] Inventors: Robert J. Gielink, Mentor; Michael D. Albers, Rocky River, both of Ohio

[73] Assignee: Air-Maze Corporation, Stow, Ohio

[21] Appl. No.: 838,405

[22] Filed: Apr. 7, 1997

[51] Int. Cl.$^6$ ............................................. B01D 27/08
[52] U.S. Cl. ................. 55/385.3; 55/498; 55/502; 55/510; 55/514
[58] Field of Search ........................ 95/273; 123/198 E; 55/498, 502, 503, 504, 510, 493, 490, 482, 480, 413, 330, 414, 381.3, 514

[56] References Cited

U.S. PATENT DOCUMENTS

| | | | |
|---|---|---|---|
| 2,675,886 | 4/1954 | McMullen | 55/510 |
| 3,130,025 | 4/1964 | Bowden et al. | 55/503 |
| 3,218,785 | 11/1965 | Tietz | 55/503 |
| 3,680,286 | 8/1972 | Nostrand et al. | 55/514 |
| 3,785,129 | 1/1974 | Szmutko | 55/514 |
| 4,135,899 | 1/1979 | Gauer | 55/482 |
| 5,484,466 | 1/1996 | Brown et al. | 55/514 |
| 5,685,985 | 11/1997 | Brown et al. | 55/514 |

FOREIGN PATENT DOCUMENTS

| | | | |
|---|---|---|---|
| 535063 | 5/1973 | Switzerland | 55/514 |

*Primary Examiner*—Jay H. Woo
*Assistant Examiner*—Minh-Chau T. Pham
*Attorney, Agent, or Firm*—Rankin, Hill, Porter & Clark LLP

[57] ABSTRACT

An air cleaner including a housing and a filter element. The housing has an air inlet and an air outlet, and includes a body having an open end, and a removable end cap adapted to close the open end of the body. The filter element is positioned within the housing between the air inlet and the air outlet. The filter element is securely attached to the end cap to be removable from the housing when the end cap is removed from the body. The permanent attachment of the filter element to the housing end cap in accordance results in a more reliable filter because the proper sized filter element is always present and securely positioned in the housing when the housing is closed.

20 Claims, 4 Drawing Sheets

AIR CLEANER HAVING FILTER ELEMENT INTEGRALLY FORMED WITH HOUSING END CAP

BACKGROUND OF THE INVENTION

1. Field of the Invention

This invention relates to air cleaners, and more particularly to air cleaners having replaceable filter elements within cylindrical protective outer housings.

2. Description of the Prior Art

Air cleaners or air filters are well known in the art and are commonly used to clean intake air for engines, compressors, cabin ventilation systems and other devices. The air cleaners generally include a protective generally cylindrical housing within which are one or more cylindrical filter elements. In addition to a primary filter element, a secondary filter element or safety or supplementary filter element may be included inside the primary filter element. An air inlet is connected to the housing body, and air enters the outside of the filter element where it is drawn through the filter elements to an air outlet connected to the interior of the filter elements. This general design is also utilized in two-stage air cleaners in which a cyclonic flow is imparted to the incoming air to separate larger dirt particles from the air flow.

The air cleaner housing usually includes a removable portion so that the filter elements inside can be removed for cleaning or replacement. Often, the removable housing portion is an end cap detachably mounted on one end of the cylindrical housing body. In the past, the entire housing was made of metal, and clamps or a tie rod was used to hold the end cap to the housing body to close the housing and to secure the filter elements inside. More recently, plastic molded housings have been developed, and a bayonet coupling has been built into the elements of the housing to provide a means for holding the end cap to the body and securing the filter elements. This bayonet coupling is shown in patent application Ser. No. 08/498,418, which is assigned to the assignee of the present invention. The bayonet coupling has made the end cap easier to attach to the body, has allowed for a smaller operating envelope when servicing the filter elements, has provided a less expensive and more reliable attachment means, and has provided for an entirely non-metal housing which is lighter and less prone to corrosion.

Among the problems in prior art air cleaners is assuring that the filter elements are present and that the proper sized filter element is used in the housing. As the filter elements become dirty and worn, they must eventually be replaced. After removing a spent filter element, it has been possible for the user to close and to seal the filter housing and to continue to operate the filter without a replacement filter element. This, of course, renders the filter useless. It is also possible for the user to replace the filter element with one of a different size or shape. A smaller sized filter element may fit within the housing, but it would allow air to bypass the filter, making the filter ineffective.

SUMMARY OF THE INVENTION

The present invention overcomes these and other problems of the prior art and provides other advantages that have not been realized heretofore. The present invention provides an air cleaner in which the filter element is integrally formed with one end of the outer housing. The permanent attachment of the filter element to the housing end cap in accordance with the present invention results in a more reliable filter because the proper sized filter element is always present and securely positioned in the housing when the housing is closed.

The filter construction of the present invention prevents the operation of the filter without a filter element. Since the filter element is permanently attached to the housing end cap, it is not possible to close the filter housing without a filter element inside the housing. Furthermore, the present invention assures that a proper sized filter element will be used, since the filter element is sized to fit the housing end cap on which it is attached. In addition, the filter element will always be properly oriented with respect to the housing, since it is in a fixed orientation with respect to the housing end cap and the end cap must be properly aligned with respect to the housing body before the housing can be closed.

Because the filter element is attached to the end cap, the filter element is protected before and during the installation process. The end cap provides a protective collar for the filter element, making the filter element less likely to be damaged by being bumped against objects before and during installation.

In addition, the configuration of the present invention greatly facilitates the so-called "blind" installation of a replacement filter, that is, where the installation of a replacement filter in an air cleaner is difficult to view. Such an installation sometime occurs when the air cleaner is mounted in a location which is difficult to access such as in a confined engine compartment. Such an installation must often be performed with only one hand, and must be preformed without being able to see the proper installation of the filter element.

The present invention also assures that the proper seal will be provided at the end of the filter element. While prior art filter elements usually provided adequate seals at each end, there was always the possibility that the filter element could be slightly misaligned or that foreign matter could interfere with the seal at the end of the filter element. Since the filter element of the present invention is permanently attached at one end to the end cap, it is not possible for the seal between the end cap and the filter element to become damaged or ineffective.

The design of the present invention also assists in the effectiveness of the attachment of the housing portions. With the bayonet coupling, it is important that the sealing member on the filter element provides a spring force tending to urge the housing elements away from each other so that the bayonet coupling elements are held in place. This spring force must be great enough to hold the bayonet coupling in place, but it must not be too great to interfere with easy attachment of the housing portions. Since the filter element of the present invention is permanently attached at one end to the filter housing, the filter element has a sealing member at only one end. A single sealing member thus provides the spring force to hold the bayonet coupling, and the creation and maintenance of the proper spring force is much easier to achieve in a single sealing member.

These and other advantages are provided by the present invention of an air cleaner which comprises a housing and a filter element. The housing has an air inlet and an air outlet, and comprises a body having an open end, and a removable end cap adapted to close the open end of the body. The filter element is positioned within the housing between the air inlet and the air outlet. The filter element is securely attached to the end cap to be removable from the housing when the end cap is removed from the body.

DETAILED DESCRIPTION OF THE PREFERRED EMBODIMENT

Figure 1:
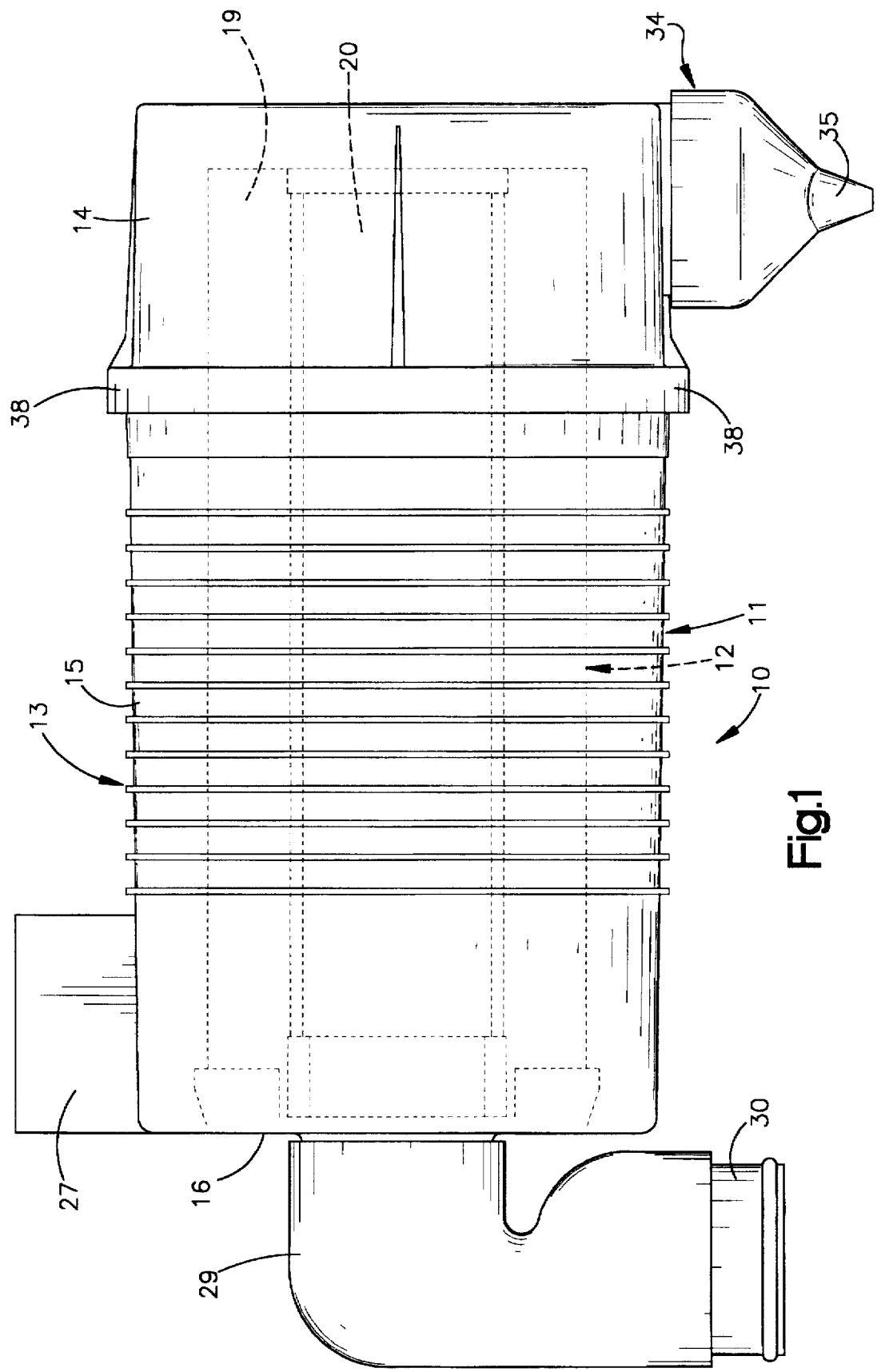
FIG. 1 is a side elevational view of the air cleaner of the present invention.

Referring more particularly to the drawings and initially to FIG. 1, there is shown a two-stage air cleaner 10 according to the present invention. The air cleaner 10 comprises an outer protective housing portion 11 and an inner filter element assembly 12 mounted within the housing portion.

The outer housing portion 11 is formed of a body 13 and an end cap 14, both preferably made of a suitable rugged moldable plastic material, such as polypropylene. The body 13 comprises a generally cylindrical outer side portion 15 and an end portion 16 closing one end of the cylindrical side portion. The generally cylindrical side portion 15 of the body 13 defines a central axis of the air cleaner 10. A bowl shaped end cap 14 is removably attached to the other open end of the body 13. The body 13 and the end cap 14 can be made of any suitable material, with the preferred material being a polypropylene material.

The filter element assembly 12 comprises a primary filter element 19 and a safety or supplementary filter element 20. The filter element 19 is intended to be replaceable, and is made of pleated filtering media 21, such as, for example, resin impregnated cellulosic fibers, woven wire mesh, fiberglass or an adsorbent material, all as is known in the art. The filter element 19 is generally cylindrical with one end permanently or integrally attached at one end to the housing end cap 14, as explained in more detail below. The other end of the filter element 19 has a soft, flexible, resilient sealing member 22 on its end. The sealing end member 22 is integrally formed by being molded onto one end of the filter media 21, and is in the shape of an annular ring which is open in the middle. The primary filter element may also include a protective screen on the inside and/or the outside of the filter media 21. The optional safety or supplemental filter element 20 is mounted within the primary filter element 19. The safety or supplemental filter element 20, which may be of any type known in the art, is mounted coaxially within the primary filter element 19 and provides additional or "back-up" filtering capability in the event that any particles are not removed by the primary filter element 19. Alternatively, the supplemental filter element 20 may be an adsorbent, such as a carbon tube, for removing certain gaseous contaminants. The filter element 20 is also generally cylindrical with soft, flexible, resilient sealing members 23 and 24 on each end. One sealing member 23 is in the shape of an annular ring which is open in the middle like the sealing member 22, and the other sealing end member 24 Is in the shape of a disc which is closed in the middle.

Figure 2:
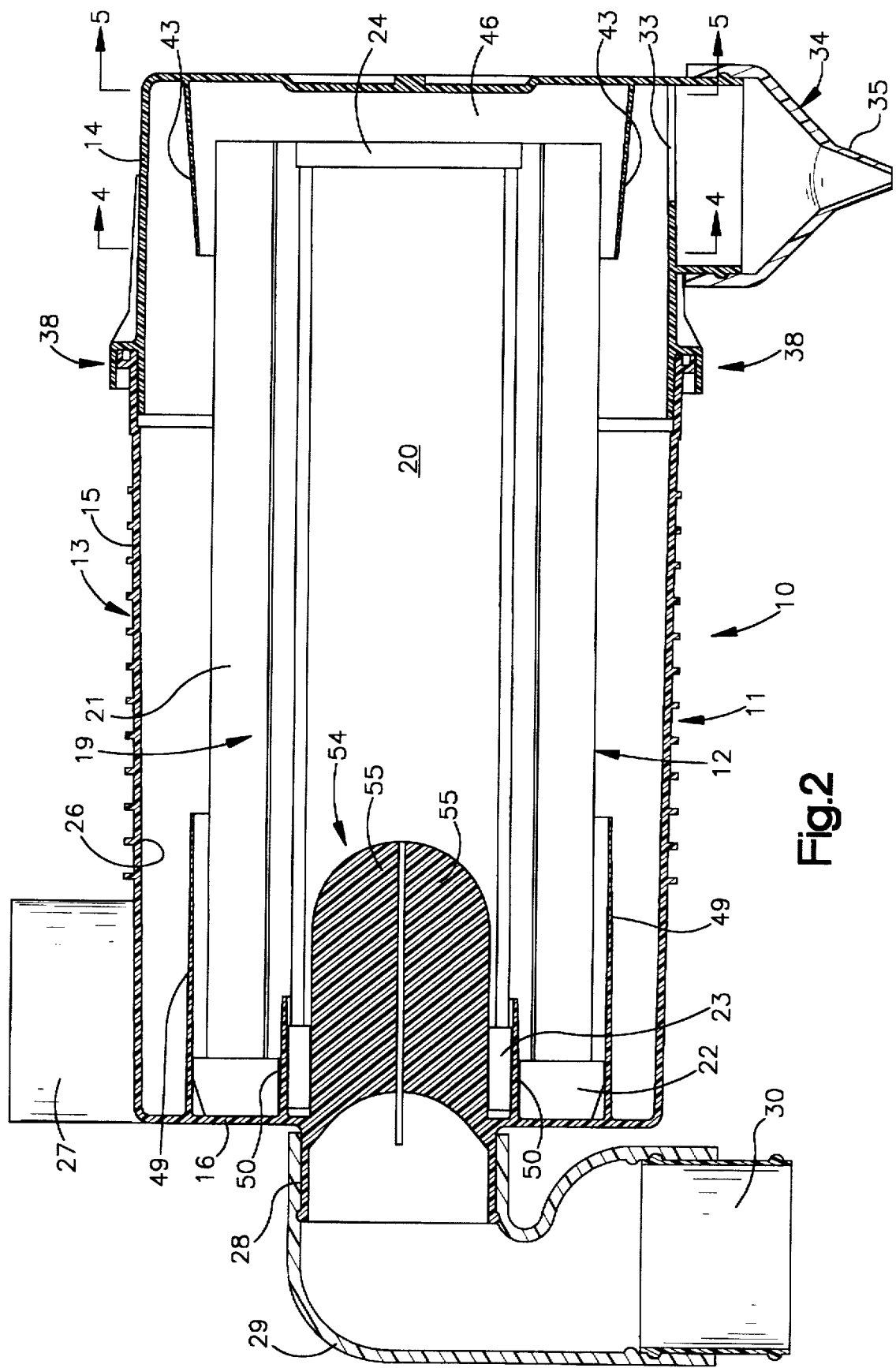
FIG. 2 is another side elevational view of the air cleaner of FIG. 1 partially in section.

Referring to FIG. 2, a separation chamber 26 is formed around the outside the primary filter element 19, between the primary filter element and interior surface of the cylindrical side portion 15 of the body 13. Air enters the cleaner 10 through an air inlet 27 which is formed in the side portion 15 of the body 14 near the end portion 16 and which extends tangentially from the axis of the air cleaner. The orientation of the air inlet 27 imparts a swirl to the air as it enters the separation chamber 26, and this swirl creates a cyclone effect in which centrifugal force causes heavier dirt particles entrained in the air to be forced to the interior wall of the side portion 15, where they travel along the wall to the end cap 14. The air then travels through the primary filter element 19 and through the supplementary filter element 20 into interior of the supplemental filter element where it enters an air outlet 28. The air exits the air cleaner 10 through the air outlet 28 which is formed in the end portion 16 of the body 13 and which extends axially from the end portion. An outlet elbow 29 may be connected to the outlet 28, if desired. The end of the outlet elbow 29 may have a connection 30 which can be connected to a conventional hose leading to the air supply of an engine or other device for which clean air is supplied.

The dirt particles which have been separated from the air flow by the cyclone action in the separation chamber 26 accumulate in the end cap 14 where they drop through an opening 33 in the end cap 14 so that they can be periodically and/or continuously removed through an unloader valve 34. The unloader valve 34, which is attached to a vertically extending tube in the end cap 14, includes an elongated flexible rubber nipple having lips 35 which can be separated to allow dirt particles to escape. The lips 35 open when dirt accumulates in the unloader valve 34, and this allows the dirt to be dumped from the end cap 14. The lips 35 are otherwise closed together by the reduction of pressure within the air cleaner resulting from the moving air in the air cleaner. As shown in the drawings, the end cap 14 is preferably positioned so that the unloader valve 34 is pointed downwardly, in order to allow the dirt to accumulate in the valve. The end cap 14 may be provided with a label or other suitable indicia to assist the user in positioning the end cap so that the unloader valve is pointed downwardly.

A bayonet coupling 38 is used to attach the end cap 14 to the body 13. This bayonet coupling is explained in detail in patent application Ser. No. 08/498,418, the disclosure of which is hereby incorporated by reference in its entirety. The bayonet coupling 38 includes a plurality of tabs 39 (FIG. 3) extending outwardly around the exterior of the body where the body is connected to the end cap 14. The end of the end cap 14 is provided with a radially extending rim 40, and the tabs 39 engage the rim when the end cap abuts the body. A plurality of slots are formed in the rim 40 and are capable of being engaged by some of the tabs 39. Each of the slots extends circumferentially, and at one end of each slot is an opening into which one of tabs 39 can enter the slot as the end cap 14 is rotated relative to the body 13. At the other end of each slot is a locking position or locking groove. In addition to sealing the filter elements 19 and 20 to the ends of the housing and preventing the flow of air around the filter elements inside the air cleaner, the soft, flexible, resilient sealing elements 22, 23 and 24 also provide a spring force which urges the end cap 14 away from the body 13. These elements thus function as spring members which supply a force to maintain the tabs 39 in the locking grooves in the slots and holds the end cap 14 securely to the body 13. The end cap 14, however, can be easily removed by pushing the end cap 14 toward the body to overcome the spring force of the sealing elements 22, 23 and 24 so that each of the tabs 39 can be moved away from the locking portion of the slots. The end cap 14 can then be rotated with respect to the body 13 to move the tabs 39 through the slots until the tabs reach the slot openings. The end cap 14 is then removed from the body 13 by moving it axially with respect to the body.

While prior art filter elements have traditionally been separate from the housing portions, the primary filter element 19 of this invention is permanently affixed at one end to the housing end cap 14. One of the problems in attaching the filter element to the housing end cap is that the end cap is usually made of a rugged plastic material such as polypropylene to which most adhesives will not adhere. Therefore, it is not possible merely to glue the filter element to the housing end cap, since the glue will not properly adhere to the end cap, and the assembly will come apart when the user attempts to remove the filter element. The present invention solves this problem by providing a mechanical interlock between the end of the filter element and the inside of the housing end cap 14.

Figure 3:
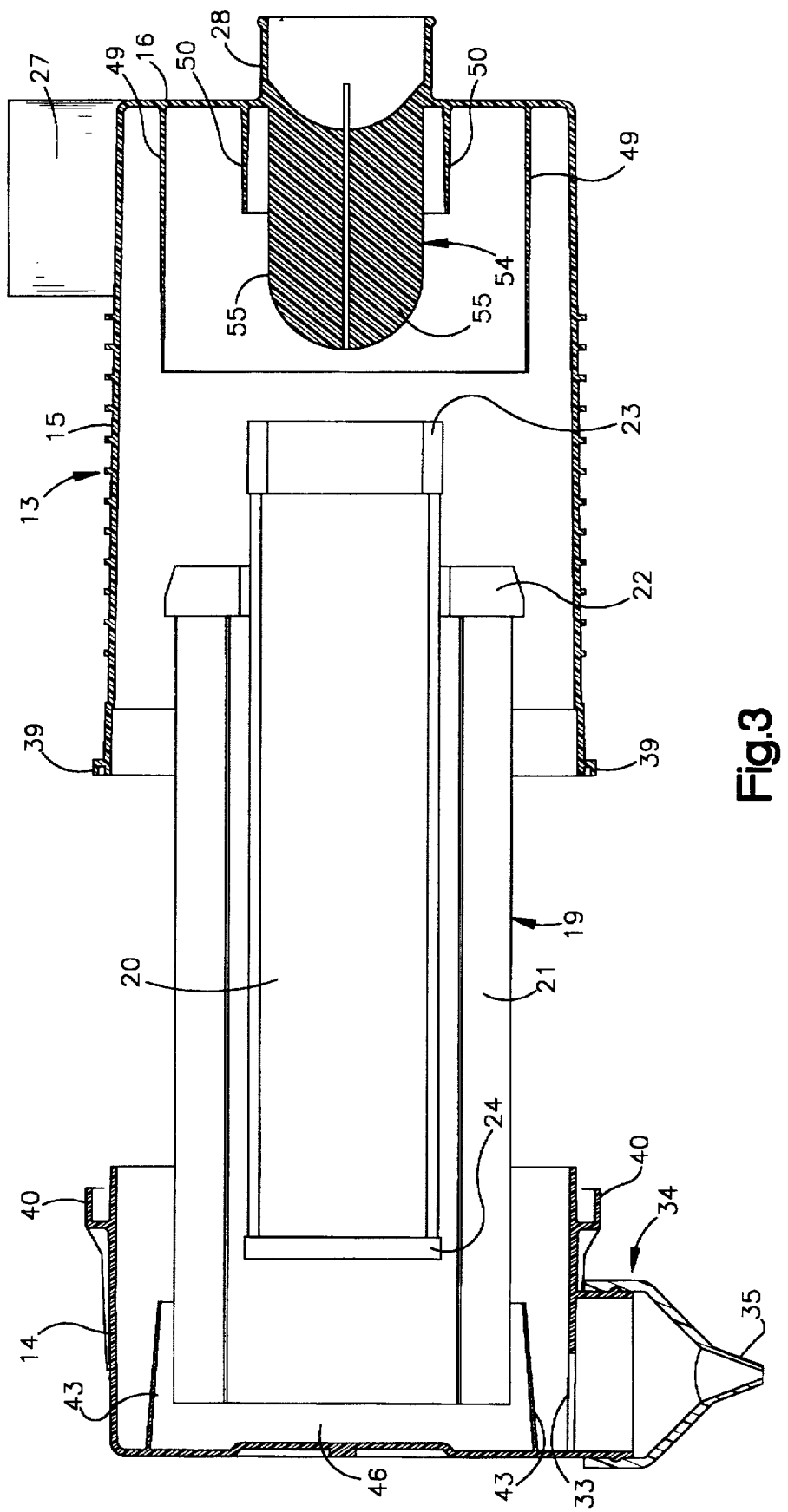
FIG. 3 is a side partially sectional view of the air cleaner similar to FIG. 2 with parts of the air cleaner disassembled.
Figure 4:
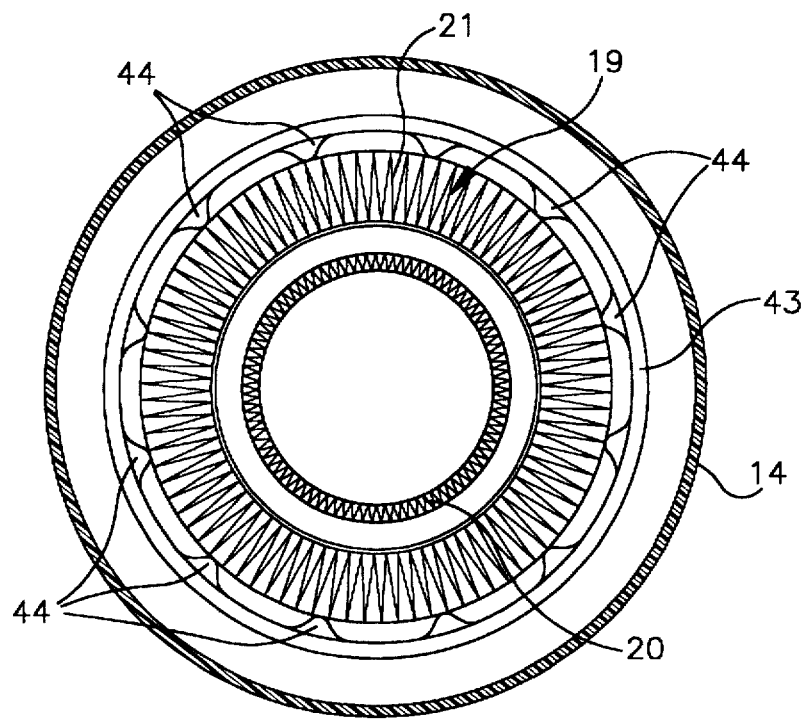
FIG. 4 is an end sectional view taken along line 4—4 of FIG. 2.
Figure 5:
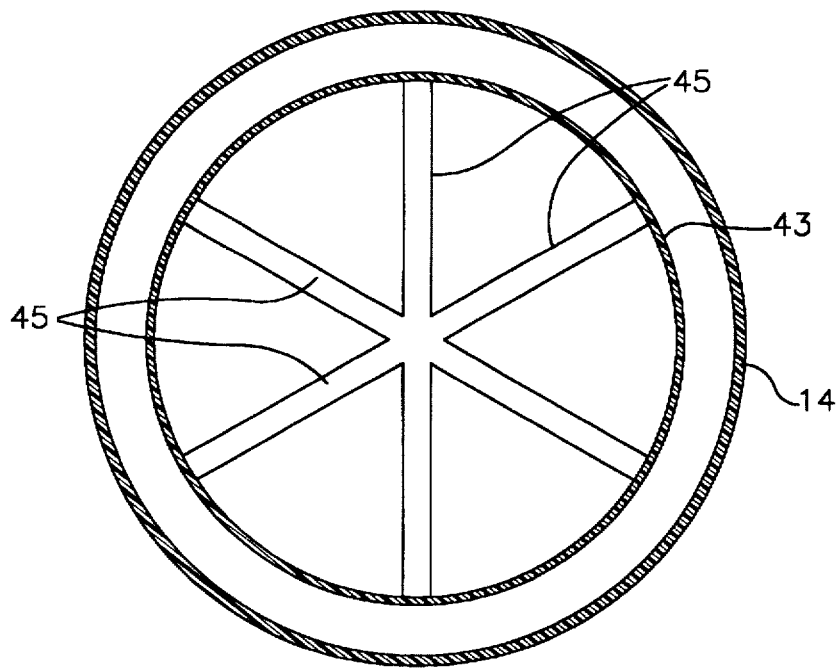
FIG. 5 is an end sectional view taken along line 5—5 of FIG. 2.

As shown in FIGS. 2 and 3, the end cap 14 includes a cylindrical shroud 43 which extends along the exterior of the primary filter element 19 and which holds the primary filter element in place. The interior of the shroud is preferably provided with ribs 44 (FIG. 4) which extend generally parallel to the axis of the air cleaner. The shroud 43 is also preferably tapered slightly in the direction away from the end cap, so that it has a larger diameter adjacent to the end cap and a smaller diameter at its distal end, as can be seen in FIGS. 2 and 3. In addition, the inside surface of the end cap 14 within the shroud 43 may be provided with radially extending grooves or ridges 45 (FIG. 5). A layer 46 of a suitable hardenable plastic material, such as polyurethane, is placed within the shroud 43 in the end of the filter element in place to permanently or integrally affix the end of the filter element 19 to the end cap 14. The tapered configuration of the shroud 43 along with the axially extending ribs 44 and the radially extending grooves or ridges 45 provide a mechanical interlock between the hardenable material 46 and the material of the end cap 14 to prevent the filter element 19 from being separated from the end cap.

The end portion 16 of the housing body also preferably includes a cylindrical shroud 49 which also extends along the exterior of the other end of the primary filter element 19 and which positions and holds the other end of the primary filter element in place. The shroud 49 defines the separation chamber 26 and prevents impingement of the dirt on the filter media of the element 19. Another smaller cylindrical shroud 50 is located radially inside the shroud 49 and extends along the interior of the primary filter element 19 to seal radially inwardly against the end ring on the primary filter element. The end ring 22 of the primary filter element 19 thus fits between the shrouds 49 and 50 and the end ring provides an additional axial seal between the primary filter element and the end portion 16 of the body 13.

To provide proper positioning of the safety or supplemental filter element 20, a positioning guide 54 may be provided in the end portion 16 of the body 13 at the air outlet 28. The positioning guide 54 preferably includes four fins 55 which extend from the end portion 16 at the air outlet 28 and which extend perpendicularly with respect to each other in radial planes, forming a cross when viewed from the end of the air cleaner, and allowing for the free flow of air from the supplemental filter element 20 and through the air outlet 28. The fins 55 extend for a substantial distance within the interior of the safety filter element and assure that the filter element maintains a substantially axial orientation within the body of the air cleaner before the end cap 14 is attached. Since the primary filter element 19 fits tightly over the supplemental filter element 20, the maintenance of proper axial orientation of the supplemental filter element assures that the primary filter element will also be maintained in a substantially axial orientation within the body of the air cleaner when the end cap 14 is attached.

In the manufacture of the air filter assembly of the present invention, the elements of the housing 11 are manufactured using conventional plastic molding techniques, with the end cap 14 and the body 13 molded separately. The primary filter element 19 is manufactured in accordance with conventional techniques, but without an end cap at one end, so that the partially assembled primary filter element only comprises the pleated filter media 21, the end ring 22 and any outer cylindrical protective screen for the filter media. The partially assembled primary filter element is then positioned relative to the housing end cap in a suitable jig, and the hardenable plastic material is poured into the reservoir formed within the shroud 43. The material surrounds and permeates the end of the filter media of the filter element 19. The material is allowed to harden to form the layer 46 which is integrally molded around the filter media 21 and any protective screen. Since the shroud 43 tapers and since the diameter of the hardened layer 46 adjacent to the end of the end cap 14 is thus wider than the diameter of the layer 46 at the rim of the shroud, the layer 46 is trapped within the shroud, forming the mechanical interlock. Further, the presence of the ribs 44 and the corresponding axial grooves formed when the layer 46 is formed prevent rotation of the layer and the primary filter element relative to the end cap. Similarly, the grooves or ridges 45 and the corresponding formation in the layer prevent movement of the layer relative to the end cap 14.

The present invention thus provides for the replacement of the end cap 14 every time the filter element 19 is replaced. This means that a new unloader valve 34 is also installed on the air cleaner each time the filter element 19 is replaced. This provides an additional advantage, since the unloader valve 34 may otherwise become worn and ineffective. In many installations, such as on tractor engines, the engine exhausts under the hood rather than through a separate exhaust stack which extends through the hood. Since the air intake is thus closer to the exhaust, more of the dirty exhaust air is sucked back into the air cleaner inlet. The dirty exhaust typically includes soot which can be sticky and which can adhere to various surfaces, including the surfaces of the unloader valve. Soot is therefore likely to build up on the inside of the unloader valve in such installations, and this buildup can eventually interfere with the proper functioning of the valve. By replacing the unloader valve each time the filter element is replaced, a new clean unloader valve is periodically provided which functions much more effectively.

Various modifications can be made to the preferred design just described. The filter element has been described as being attached to the end cap using a shroud configuration and a hardenable material which provides a mechanical interlock. This arrangement is preferred because the conventional rugged plastic material of the end cap, such as polypropylene, would not easily adhere to the hardenable material so as to provide a strong adhesive bond, and a mechanical interlock is thus preferable. The housing, including the end cap, can, however, be made of other materials, and such materials may be compatible with adhesive materials which can permanently adhere the end of the filter element to the housing end cap. Alternatively, the end cap may be molded with the end of the filter element in place, providing a strong permanent connection between the end cap and the filter element. Other means of permanently adhering the end cap to the filter element or of making the filter element and the end cap integral with each other may be used. For example, instead of providing the tabs on the end cap 14 and the slots 41 on the body 13, the tabs can be located on the body and the slots on the end cap. In addition a greater or lesser number of tabs and slots can be provided depending upon the size of the air cleaner.

The operation of the air cleaner can also be modified. The cyclonic action provided in the separation chamber 26 may be eliminated, and filtering can occur with this operation. In addition, the air cleaner can be configured so that the flow occurs in the reverse direction from that previously described in the contaminated air enters through the center of the air cleaner and flows radially outwardly through the filter elements to the periphery of the filter elements. Such modifications are within the skill of the art.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. An air cleaner which comprises:
   a housing having an air inlet and an air outlet, the housing comprising
      a body having a closed end, a side portion, and an open end, and
      an end cap removably connected to the side portion of the body at the open end to close the open end of the body; and
   a filter element positioned within the housing between the air inlet and the air outlet when the end cap is connected to the body, the filter element being permanently attached to the end cap, the filter element being removable from the body when the end cap is removed from the body.

2. An air cleaner as defined in claim 1, wherein the end cap and filter element permanently attached thereto is replaceable.

3. An air cleaner as defined in claim 1, wherein the end of the filter element which is permanently attached to the end cap is molded to a layer of hardenable material.

4. An air cleaner as defined in claim 3, wherein the end cap includes a shroud within which the layer of hardenable material is placed when it is molded to the filter element.

5. An air cleaner as defined in claim 4, wherein the shroud is configured to trap the layer of hardenable material within the shroud when it hardens to form the mechanical interlock.

6. An air cleaner which comprises:
   a generally cylindrical housing comprising
      a body having a closed end, a side portion, and an open end, said body having two openings, one opening forming an air inlet and the other opening forming an air outlet, one opening extending from the side portion of the body and the other opening extending axially from the closed end of the body, and
      an end cap removably connected to the side portion of the body at the open end by a bayonet coupling formed between the end cap and the side portion of the body at the open end to sealingly close the housing at the bayonet coupling connection and substantially prevent the flow of air therethrough; and
   a filter element positioned axially within the housing between the air inlet and the air outlet when the end cap is connected to the body, the filter element being permanently attached to the end cap at one end and having a resilient sealing member at the other end to seal the filter element against the closed end of the body and to produce a spring force which urges the end cap away from the body to secure the bayonet coupling connection when the end cap is connected to the body.

7. An air cleaner as defined in claim 6, comprising in addition, a supplemental filter element between the filter element and the air outlet.

8. An air cleaner as defined in claim 6, wherein the end cap and filter element permanently attached thereto is replaceable.

9. An air cleaner as defined in claim 6, wherein the end of the filter element which is permanently attached to the end cap is molded to a layer of hardenable material.

10. An air cleaner as defined in claim 9, wherein the end cap includes a shroud within which the layer of hardenable material is placed when it is molded to the filter element.

11. An air cleaner as defined in claim 10, wherein the shroud is configured to trap the layer of hardenable material within the shroud when it hardens to form the mechanical interlock.

12. An air cleaner as defined in claim 1, wherein the end cap is removably connected to the side portion of the body at the open end by a bayonet coupling formed between the end cap and the side portion of the body at the open end to sealingly close the housing at the bayonet coupling connection and substantially prevent the flow of air therethrough.

13. An air cleaner as defined in claim 1, comprising in addition a supplemental filter element between the filter element and the air outlet.

14. An air cleaner as defined in claim 1, wherein the housing is made of a moldable plastic material.

15. An air cleaner as defined in claim 1, wherein the filter element is permanently attached to the end cap using adhesive.

16. An air cleaner as defined in claim 1, wherein the end cap is molded with the end of the filter element in place.

17. An air filter as defined in claim 6, wherein the air inlet is oriented such that air entering the housing is imparted with a cyclonic swirl around the interior wall of the side portion of the body, and the end cap includes a dirt particle unloader valve.

18. An air cleaner as defined in claim 6, wherein the housing is made of a moldable plastic material.

19. An air cleaner as defined in claim 6, wherein the filter element is permanently attached to the end cap using adhesive.

20. An air cleaner as defined in claim 6, wherein the end cap is molded with the end of the filter element in place.

* * * * *